United States Patent [19]
Ehret et al.

[11] 3,808,742
[45] May 7, 1974

[54] WINDOW

[75] Inventors: Yale W. Ehret; Russell O. Anderson, both of Elkhart, Ind.

[73] Assignee: The Adams & Westlake Company, Elkhart, Ind.

[22] Filed: Sept. 20, 1972

[21] Appl. No.: 290,707

[52] U.S. Cl.................... 49/413, 49/449, 49/456, 160/91
[51] Int. Cl............................................. E05d 15/06
[58] Field of Search ............ 49/413, 501, 504, 505, 49/453, 456, 454; 160/91; 52/312; 287/189, 36 H

[56] References Cited
UNITED STATES PATENTS

| | | | |
|---|---|---|---|
| 2,114,896 | 4/1938 | Axe....................................... | 49/456 |
| 2,916,112 | 12/1959 | Kiehl......................... | 287/189.36 H |
| 3,374,590 | 3/1968 | Kessler................................. | 52/312 |
| 3,555,736 | 1/1971 | Koch et al. ............................ | 49/504 |
| 3,702,517 | 11/1972 | Martin .................................. | 49/504 |
| 2,762,087 | 9/1956 | Sylvan................................... | 49/456 |

*Primary Examiner*—Kenneth Downey
*Attorney, Agent, or Firm*—Guy A. Greenawalt

[57] ABSTRACT

A window construction which is adapted to be mounted in an opening in a wall of a recreational vehicle or the like, and which comprises, in the form shown in the drawings, a generally oblong frame of extruded metal with parallel glazing channels for receiving a fixed glass panel member and a co-operating sliding glass panel member together with a sliding screen member for the opening when the sliding glass panel member is moved to an open position. The frame has a peripheral flange for securing to the outside face of the wall, with a fastener concealing strip, and an inside trim member is provided which adapts the frame for mounting in different thickness walls. The screen member which rides in an inner channel in the frame is held in its channel and readily removable. The sliding glass panel member which rides in the outermost channel in the frame is readily removable by first removing a section of a guide track in the channel in which it is normally seated. The fixed glass panel member has three of its marginal edges normally held in an intermediate channel by a removable wedge-type glazing strip. When the arrangement comprises a fixed glass panel member flanked by sliding panel members on each side thereof the fixed panel member will have two of its marginal edges held in an intermediate channel by a removable wedge-type glazing strip.

12 Claims, 7 Drawing Figures

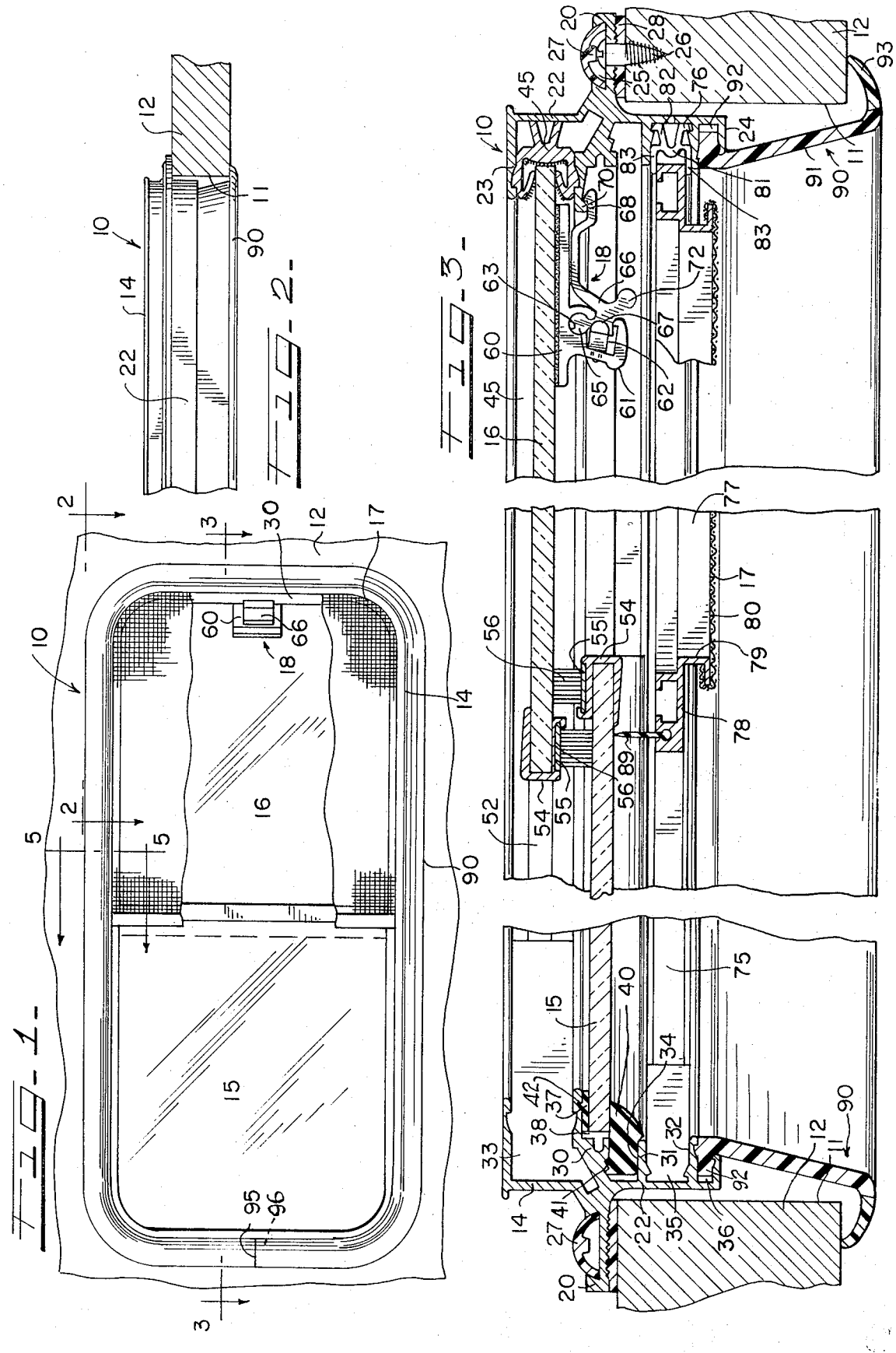

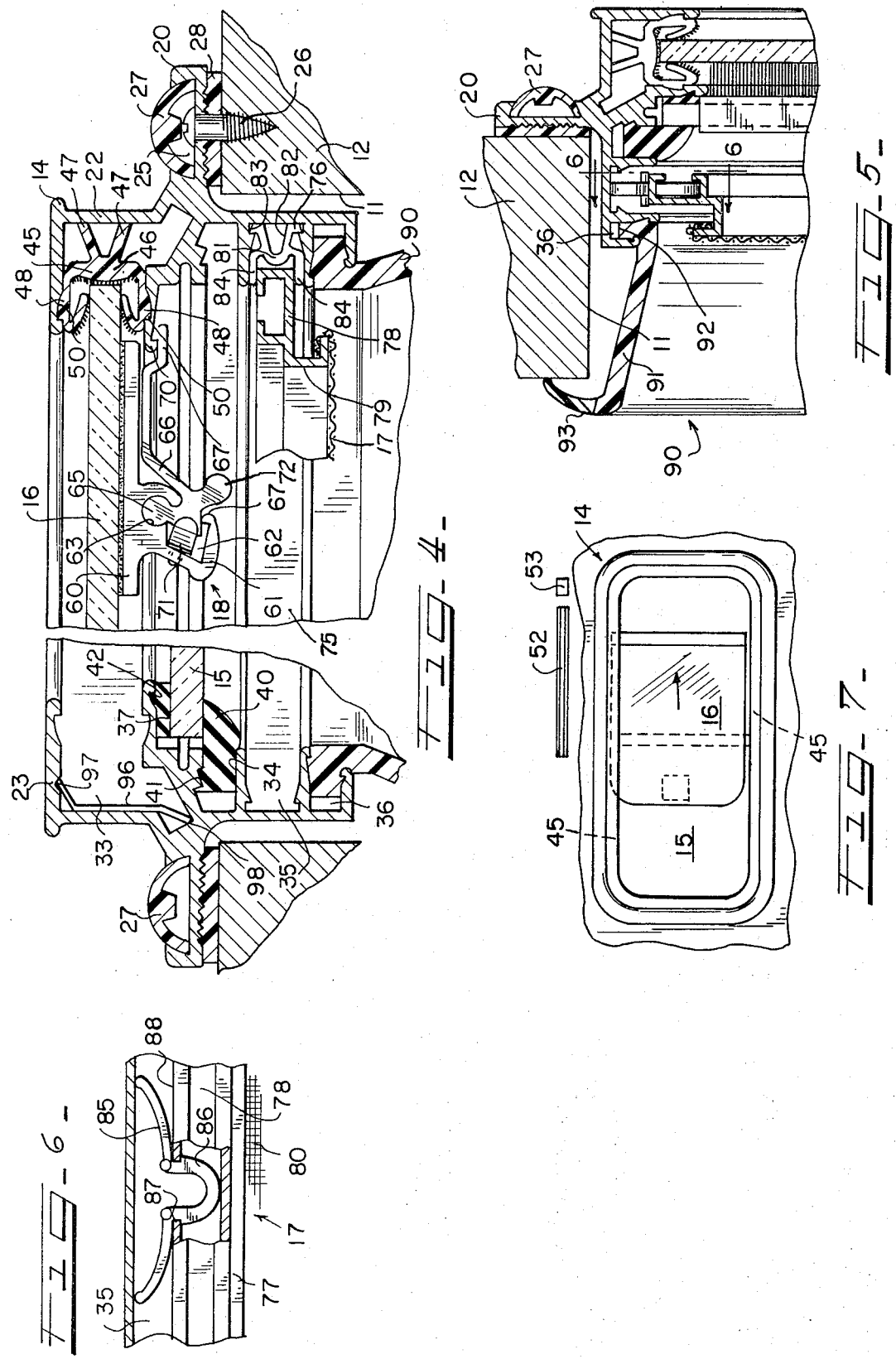

WINDOW

This invention relates to window constructions and is more particularly concerned with improvements in a window of the type having a frame with channels for receiving a fixed panel of glass and one or more co-operating sliding panels of glass together with a sliding screen for the opening when a sliding glass panel is moved to open position.

It is a general object of the invention to provide a window structure which is particularly adapted for mounting in an opening in a wall of a vehicle, for example, a motor home, a travel trailer, or a similar recreational vehicle, and which comprises a mounting frame having a peripheral flange with fasteners for attaching the frame to the outside face of the wall at points around the opening and with an inside frame member enabling the frame to be mounted in walls of varying thickness, wherein the frame has glazing channels for mounting therein a fixed panel of glass, a sliding panel of glass and a sliding screen member, with provision for adequately sealing the fixed and movable members against the passage of undesired material when closed while permitting ready removal and replacement of the screen and the glass panels.

A still more specific object of the invention is to provide a window construction for mounting in a wall opening, wherein a mounting frame is provided with a means for attaching the same to the outside of the wall in which the frame is positioned and also with an inside trim strip which is adjustable to accommodate walls of varying thickness, and wherein the frame has glazing channels arranged so as to permit a fixed glass panel to be positioned in a middle channel and a sliding glass panel to be mounted in an outside channel by means of resilient glazing members, with the latter having a removable portion which enables the sliding glass panel to be readily removed for replacement and a sliding screen mounted in an inside channel and having compressible mounting elements which enables the screen to be readily released for removal by movement in the plane of the mounting channel.

These and other objects and advantages of the invention will be apparent from a consideration of the window construction which is shown by way of illustration in the accompanying drawings wherein:

FIG. 1 is an elevational view showing a window structure which incorporates the principal features of the invention, the window being mounted in an opening in the vertical wall of a vehicle;

FIG. 2 is a fragmentary view taken on the line 2—2 of FIG. 1, to an enlarged scale;

FIG. 3 is a sectional view taken on the line 3—3 of FIG. 1, to a still larger scale and with portions broken away;

FIG. 4 is a sectional view showing portions of FIG. 3 to a still larger scale;

FIG. 5 is a cross sectional view taken on the line 5—5 of FIG. 1, to a greatly enlarged scale;

FIG. 6 is a view taken on the line 6—6 of FIG. 5 and with portions broken away; and FIG. 7 is an elevational view of the opposite face as shown in FIG. 1 illustrating the manner in which the sliding panel member is removed.

Referring first to FIGS. 1 to 3, there is illustrated a window structure 10 which is mounted in an opening 11 in the vertical wall 12 of a vehicle, for example, a motor home, a travel trailer, or a similar recreational vehicle. The window structure 10 includes a supporting frame 14 which is secured in the opening 11 and which has mounted therein a fixed glass panel member 15, a co-operating sliding glass panel member 16 and a sliding screen assembly 17, the latter being movable into and out of the position shown to cover the opening when the sliding glass panel 16 has been moved to the left in FIGS. 1 and 3 and to render accessible the latch assembly 18 which is grasped to move the glass panel 16.

The supporting or mounting frame 14 (FIGS. 3, 4 and 5) is formed of extruded aluminum or other suitable metal which is shaped or bent into a generally rectangular form, with rounded corners, as shown in FIG. 1. A flange formation 20 extends outwardly in a plane normal to the substantially planar base or web section 22 on a line approximately midway between a relatively narrow outside flange member 23 and a still narrower inside flange member 24. The flange members 23 and 24 extend inwardly of the web section 22 in planes normal to the plane of said web section 22 and constitute the outer and inner faces of the frame 14. The outwardly extending flange member 20 is provided with a groove 25 in which may be provided holes for screws 26 or other suitable fasteners for securing the frame to the wall 12 at points spaced about the periphery of the frame. The groove 25 has undercut edges for receiving a cover strip 27 of rubber, resilient plastic or other suitable material which may be secured in the groove 25 to conceal the fasteners 26 and form an outside trim strip. In mounting the frame 14 in the opening 11 a sealing gasket 28 of suitable material may be positioned beneath the flange member 20.

The frame 14 has inwardly directed, spaced, parallel members 30, 31 and 32 on the inner face of the web section 22 which, with the outside and inside face members 23 and 24 define inwardly opening grooves or channels 33, 34, 35 and 36. The intermediate channel 34 constitutes a glazing channel for receiving in fixed position therein marginal edge portions of the glass panel member 15. The panel member 15 is seated initially on one face of a glazing strip 37 which lies flat against the inner margin of the member 30. The member 30 has a groove 38 at its inner margin to receive the marginal portions of the glass panel 15 which is held in place by a wedge member of rubber or other suitable material seated in the main portion of the channel 34. The wedge 40 extends about three sides of the panel 15 and may be removed to free the panel 15 for removal and replacement when desired. Small grooves 41 co-operate with bead formations on the wedge 40 to aid in holding the wedge 40 in place. The sealing or glazing strip 37 may be a relatively thin narrow strip of adhesive coated tape and a small groove 42 may be provided to co-operate with a bead on the strip to help hold it in place. The frame member 31 extends inwardly of the web 22 a distance slightly less than the distance to the bottom or outside limit of the groove 38 so as to permit ready removal and replacement of the panel 15 from the inside of the assembly upon removal of the wedge 40. The panel 15 extends approximately half the length of the frame 14 leaving an opening which is adapted to be closed by the sliding panel 16.

The sliding glass panel member 16 is mounted in the glazing channel 33 by means of a glazing strip or weather strip member 45 (FIGS. 3 to 5). The glazing member 45 is preferably formed of extruded dual durometer vinyl plastic with a rigid base portion 46 (FIG. 4), a slotted stem portion 47 forming legs for seating in the channel 33 and oppositely disposed, relatively flexible wing members 48 which are in confronting relation with their margins reversely folded inwardly so as to engage between the folded portions the margins of the panel member 16 along three sides thereof. Small grooves 50 in the oppositely disposed channel walls cooperate with bead formations on the outer faces of the wings 48 to aid in holding the strip member 45 in place. To facilitate removal of the sliding panel member 16 a section 52 (FIG. 7) of the strip member 45 at the top of the frame is mounted so that, when the panel 16 is moved to open position, the strip section 52 may be slid lengthwise in the channel 33 and removed to free the edge of the panel 16 when it is moved to closed position and permit the panel 16 to be readily removed from outside the assembly 10. A stop block 53 (FIG. 7) of rubber or other resilient material is removably positioned in the channel 33 to normally hold the strip section 52 in seated position.

The free inner marginal portions of the two panels 15 and 16 overlie each other in the closed position of panel 16 as shown in FIG. 3 and a metal strip 54 of U-shaped cross section is frictionally seated on each panel edge. The edge strips 54 have grooves 55 in their oppositely disposed faces with weatherstrip 56 seated therein so as to seal between the panels in all portions of the sliding panel 16.

The sliding panel 16 is provided with a latch assembly 18 (FIGS. 1, 3 and 4) which comprises a base plate 60 adhesively secured to the inside face of the panel 16 with a rib portion 61 having a recess 62 with a pivot portion 63 for receiving a pivot formation 65 on a manually swingable latch plate 66. The pivot formation 65 extends from a rib 67 which is confined in the recess 62 and urged to a position where the hooked end 68 engages with a keeper plate portion 70 on the frame member 30 (FIG. 4) by a C-shaped flat stainless steel spring 71 which is frictionally held in the recess 62 so as to engage the end portions against the latch plate rib 61. The spring 71 may have a protuberance on its convex face which is received in a co-operating aperture in the back wall of the recess 62 to hold the same in operative position. The pivoted latch plate 66 has a finger engaging end 72 for operating the same.

The screen 17 (FIGS. 1 and 3 to 6) is mounted for sliding movement in the guideway forming channel 35, with a non-metallic guide filler member 75 seated in the bottom portion of the channel recess 35. A stop forming member 76 is seated in the one vertical portion of the recess 35. The frame 77 for the screen member 17 comprises an extruded metal section having a main portion 78 of generally rectangular cross section of a size to fit in the guideway formed by recess 35 with the guideway filler member 75 and a flange portion 79 on which the wire screen 80 is mounted. The strip member 75 and stop member 76 are formed, preferably, of a vinyl plastic, with a cross member 81 (FIGS. 3 and 4) and a longitudinally slotted stem 82 forming legs depending therefrom which seat in the channel 35 in which there are locking grooves 83 for foot-forming portions. A guideway for the frame member 78 is formed by parallel, laterally spaced, upstanding side flanges or wings 84, The frame top section is provided with a pair of spaced, generally C-shaped spring members 85 (FIG. 6) having a bowed portion 86 intermediate the ends which is adapted to seat in an aperture 87 in the outer wall 88 of the frame member 78 so as to enable the frame 77 to be freed for removal by depressing the springs 85 through movement in the plane of the frame 77 and upwardly of the member 75 so as to lift the bottom edge out of the guideway and free the screen frame 77 for movement out of the mounting frame. A rubber seal strip 89 is carried on the inner cross frame member for sealing against the pane 15.

An inside trim strip 90 (FIGS. 1, 2, 3 and 5) completes the window assembly. The trim strip 90 is formed, preferably, of an extruded dual durometer vinyl plastic with a relatively straight, substantially rigid web portion 91. At the inner edge a relatively narrow flange 92 is formed which is adapted to be wedged into the channel recess 36, with co-operating grooves, and ribs, or the like, being provided for latching it in place. At the other edge there is a somewhat wider, reversely turned flange portion 93 which is relatively flexible and which is formed so that the free edge may bear against the inside face of the wall 12, the dimensions being such that walls of varying thickness can be accommodated. By dual durometer is meant an extruded PVC plastic section in which the main portion 91, as shown on the drawings, is formed with a vinyl material of a formulation which will result in a relatively hard and rigid section not subject to deterioration upon exposure to sun and temperature extremes such as are likely to be encountered in the use referred to, while the flange portion 93 is formed with a vinyl material of a different formation so as to be sufficiently soft or flexible to enable it to snugly engage the face of the wall 12 and with a resiliency permitting some variation in wall thickness.

In the initial assembly of the frame 14 a butt joint is formed at 95 (FIG. 1) which may be conveniently accomplished by use of a stainless steel spring splice plate 96 of relatively short length with angled side portions having one edge seated in a groove 97 provided in the frame member 23 and the opposite edge seated at 98 in the bottom of the channel recess 33. The spring plate 96 when forced therein will frictionally hold the frame ends in joined relation. Alternatively the butt joint may be welded or otherwise treated to form a connection.

While there is illustrated in the drawings and described herewith a window assembly comprising a rectangular frame in which there is a fixed glass panel at one end and a slidably mounted glass panel for closing the opening at the other end, it will be understood that other multi-panel arrangements may be provided, such as, for example, a three panel assembly with a fixed panel mounted intermediate the frame ends which has two margins held in an intermediate glazing channel by a removable wedge-type glazing strip and which is flanked by sliding panels on each side thereof.

We claim:

1. A window construction which is adapted to be mounted in an opening in a wall, and which comprises a generally oblong unitary mounting frame of extruded metal with a plurality of parallel glazing channels opening inwardly of the plane of said frame with one of said channels adapted for receiving a fixed glass panel member for covering a portion of the window opening and an adjoining channel member for receiving a co-operating sliding glass panel member adapted to be moved to and from a position to close a portion of the window opening which adjoins the fixed panel member, said mounting frame having an outwardly directed peripheral flange with means for securing said mounting frame to the outside face of the wall, and an inside trim member adapted to be secured on the inside edge of said mounting frame, a fixed glass panel member mounted in an intermediate one of said channels in the frame which is dimensioned so as to leave an opening adjacent a side thereof, a guide track forming member mounted in said adjoining channel, a sliding glass panel member mounted in said guide track member, said guide track member having a readily removable section seated in the channel which extends along the open portion of the window adjoining the fixed panel member and which is slidable in an axial direction for removal from the portion of the channel in which it is normally seated so as to release the sliding panel member for ready removal from said mounting frame.

2. A window construction as set forth in claim 1 wherein said outwardly directed peripheral flange for securing said mounting frame to the outside face of the wall is provided with an outwardly opening recess forming a continuous groove in which there are spaced apertures for receiving fastening means and a cover strip of a resilient material and a width greater than the width of said recess which may be bowed on its axis for insertion and frictionally retained in said recess so as to cover said fastening means.

3. A window construction as set forth in claim 1 wherein said inside trim member is of generally C-shape cross section with a relatively rigid main portion and a flexible edge portion, one edge of said main portion being adapted to be frictionally held in an inwardly extending channel formation at the inner edge of said mounting frame and the opposite edge portion being adapted to overlie and resiliently engage the inside face of the wall around said opening.

4. A window construction as set forth in claim 1 wherein said mounting frame has a channel forming groove at the inside edge and said inside trim member comprises a strip of plastic material of generally C-shaped cross section and provided with a beadlike edge portion adapted to be wedged into said groove, an intermediate relatively rigid main portion and an opposite marginal portion which is curved outwardly to overlie a portion of the inside wall surface which extends about the wall opening and which is positioned to bring the free edge thereof into engagement with said inside wall surface.

5. A window construction as set forth in claim 1 wherein said guide track forming member for said sliding panel member is seated in an outside one of said glazing channels and a screen member is slidingly mounted in an inside one of said glazing channels, said outside and said inside glazing channels being adjacent the intermediate channel in which said fixed panel member is mounted.

6. A window construction as set forth in claim 1 wherein said fixed panel member is secured in said intermediate glazing channel by a wedge-type glazing strip which may be removed to release the panel member for removal from said mounting frame and wherein said fixed panel member has marginal portions on at least two sides seated on an adhesive faced sealing strip.

7. A window construction as set forth in claim 5 wherein said screen member is held in said inside glazing channel by spring members which are compressible upon movement of the screen member in the plane of the glazing channel so as to enable the screen member to be removed from said frame.

8. A window construction as set forth in claim 1 wherein said sliding panel member is provided with a latch assembly having a spring pressed swingable latch arm, said latch assembly being mounted on the margin of said panel member which is adjacent the opening to be closed by said sliding panel member, and a keeper plate formation on said mounting frame which is positioned for co-operation with said latch arm when said sliding panel member is in closed position so as to latch said sliding panel member in the closed position.

9. A window construction which is adapted to be mounted in an opening in a wall, and which comprises a generally rectangular unitary mounting frame of extruded metal with parallel glazing channels opening inwardly in the plane of said mounting frame for receiving a fixed panel member which is dimensioned so as to cover only a portion of the window opening and a co-operating sliding panel member adapted to be moved to and from a position to close the remaining portion of the window which adjoins the fixed panel member, said mounting frame having an outwardly directed, peripheral flange for securing said mounting frame to the outside face of the wall, and an inside trim member adapted to be removably secured on the inside edge of said mounting frame, said fixed panel member being mounted in an intermediate channel in the frame and held therein by readily removable glazing means, said fixed panel member being dimensioned relative to the dimensions of said channel so that removal of said glazing means enables said fixed panel member to be released for removal from said frame, a guide track forming member mounted in an adjoining channel, said sliding panel member being mounted in said guide track member and said guide track member including a separate section normally seated in the channel and extending in part along the portion of the channel which borders on the opening not covered by said fixed panel member, said section being readily removable when said sliding panel is in open position so as to release said sliding panel member and thereby enabling the sliding panel member to be readily removed from said mounting frame.

10. A window construction as set forth in claim 9 wherein said sliding panel member has an edge strip mounted along the edge which adjoins the fixed panel member with a weatherstrip sealing member mounted thereon so as to engage with the opposed face of said fixed panel member and prevent entry between the panel members of undesirable material.

11. A window construction as set forth in claim 9 wherein said sliding panel member is mounted in sliding relation in an outermost glazing channel, said fixed panel member is mounted in an intermediate glazing channel and wherein a screen frame is mounted in sliding relation in an innermost glazing channel which screen frame is of a size sufficient to cover the portion of the opening which is closed by the sliding panel member in the closed position thereof.

12. A window construction as set forth in claim 9 wherein said fixed panel member is mounted in an intermediate glazing channel, said sliding panel member is mounted in an outermost glazing channel and said sliding panel member has a latch assembly including a latch arm mounted on the margin thereof which adjoins the opening adapted to be covered by the sliding panel member when closed and a keeper plate formation on said frame positioned for co-operation with said latch arm.

* * * * *